(12) United States Patent
Lee et al.

(10) Patent No.: US 9,899,906 B2
(45) Date of Patent: Feb. 20, 2018

(54) SURGE CURRENT COMPENSATING CIRCUIT AND COMPARATOR MODULE

(71) Applicant: PIXART IMAGING INC., Hsin-Chu (TW)

(72) Inventors: Chao-Chi Lee, Hsin-Chu (TW); Han-Chi Liu, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 15/606,453

(22) Filed: May 26, 2017

(65) Prior Publication Data

US 2017/0271976 A1 Sep. 21, 2017

Related U.S. Application Data

(63) Continuation-in-part of application No. 14/739,259, filed on Jun. 15, 2015, now Pat. No. 9,696,737.

(30) Foreign Application Priority Data

Dec. 24, 2014 (TW) .............................. 103145348 A

(51) Int. Cl.
*H02H 9/02* (2006.01)
*H02M 1/32* (2007.01)
*H02M 1/08* (2006.01)
*H02M 3/156* (2006.01)
*G05F 1/56* (2006.01)

(52) U.S. Cl.
CPC ............. *H02M 1/32* (2013.01); *H02M 1/083* (2013.01); *G05F 1/56* (2013.01); *H02H 9/02* (2013.01); *H02M 2003/1566* (2013.01)

(58) Field of Classification Search
CPC ... G05F 1/56; H02M 2003/1566; H02M 1/32; H02H 9/02; H02H 9/025; H02H 9/04
See application file for complete search history.

(56) References Cited

U.S. PATENT DOCUMENTS

| | | | | |
|---|---|---|---|---|
| 6,078,168 | A * | 6/2000 | Paolo ...................... | G05F 3/225 323/226 |
| 7,109,785 | B2 * | 9/2006 | Derksen .................. | G05F 3/262 323/315 |
| 9,696,737 | B2 * | 7/2017 | Liu ........................... | G05F 1/56 |
| 2003/0184268 | A1 * | 10/2003 | Perez ...................... | G05F 1/565 323/282 |

* cited by examiner

*Primary Examiner* — Jue Zhang
*Assistant Examiner* — Jye-June Lee
(74) *Attorney, Agent, or Firm* — Li & Cai Intellectual Property (USA) Office

(57) ABSTRACT

A surge current compensating circuit has a compensating current generation unit, a bias unit, and a switch unit, for compensating a surge current drawn from a supply power after an output signal of a specific circuit transits. The compensating current generation unit is electrically coupled to the output stage of the specific circuit. The bias unit is electrically coupled to the compensating current generation unit through the switch unit. Before the output signal transits, the switch unit is disabled and the compensating current generation unit is enabled, so as to draw the compensating current from the supply power. After the output signal transits, the switch unit is enabled and the compensating current generation unit is disabled, such that the compensating current is not drawn from the supply power.

11 Claims, 13 Drawing Sheets

US 9,899,906 B2

SURGE CURRENT COMPENSATING CIRCUIT AND COMPARATOR MODULE

CROSS-REFERENCE TO RELATED APPLICATION

This application is a continuation-in-part application of U.S. application Ser. No. 14/739,259 filed on Jun. 15, 2015 and entitled "SURGE CURRENT COMPENSATING CIRCUIT AND COMPARATOR MODULE", now pending. The entirety of each of the above-mentioned patent applications is hereby incorporated by reference herein and made as a part of this specification.

BACKGROUND

1. Technical Field

The present disclosure relates to a surge current compensating circuit; in particular, to a surge current compensating circuit capable of reducing a surge current generated from the supply power, and a comparator module having this surge current compensating circuit.

2. Description of Related Art

Most electronic apparatuses need a direct current (DC) supply power for providing the required power. When an output signal of the specific circuit (for example, the comparator circuit) transits (for example, changes to the high voltage level from the low voltage level), the specific circuit soon draws a large current (i.e. surge current) from the supply power, thus resulting in the unstable output current of the supply power. Therefore, the lifetimes and voltage stabilities of the specific circuit or the supply power are decreased.

Referring to FIG. 1, FIG. 1 is a circuit diagram of a typical comparator circuit. The comparator circuit 1 comprises multiple P-type transistors (for example, PMOS transistors) P1 through P3 and multiple N-type transistors (for example, NMOS transistors) N1 through N4. The sources of the P-type transistors P1 through P3 are electrically coupled to the supply power VDDA, the sources of the N-type transistors N3 and N4 are electrically coupled to the grounding voltage GND, and the gates of the N-type transistors N3 and N4 receive the bias signal VBIAS. The gate of the P-type transistor P1 is electrically coupled to the gate of the P-type transistor P2, the drain of the P-type transistor P1, and the drain of the N-type transistor N1, the drain of the P-type transistor P2 is electrically coupled to the gate of the P-type transistor P3 and the drain of the N-type transistor N2, and the gates of the N-type transistors N1 and N2 respectively receive the first input signal VIN and the second input signal VIP. The sources of the N-type transistors N1 and N2 are electrically coupled to the drain of the N-type transistor N3, the drain of the N-type transistor N4 is electrically coupled to the drain of the P-type transistor P3 and the output stage of the comparator circuit 1 to generate the output signal VOUT. By the above coupling manner, the N-type transistors N1 through N3 and the P-type transistors P1, P2 form a differential input stage, and the N-type transistor N4 and the P-type transistor P3 form an output stage.

Referring to FIG. 1 and FIG. 2, FIG. 2 is a waveform diagram showing the first input signal, the second input signal, and the current of the output stage in the typical comparator circuit. Before the time T1, when the first input signal VIN is far larger than the second input signal VIP, the current flowing through the N-type transistor N1 and the P-type transistor P1 is far larger than the current flowing through the N-type transistor N2 and the P-type transistor P2 (p.s. the summation current of the current flowing through the N-type transistor N1 and the P-type transistor P1 and the current flowing through the N-type transistor N2 and the P-type transistor P2 is denoted as the current I1), thus turning off the P-type transistor P3. Meanwhile, the N-type transistor N4 is turned on, thus the output signal VOUT is at the low voltage level, and the current I2 of the output stage associated with the comparator circuit 1 is almost zero.

Near the time T1, when the first input signal VIN gradually approaches to the second input signal VIP, and then becomes less than the second input VIP, the current flowing through the N-type transistor N1 and the P-type transistor P1 gradually decreases, and becomes less than the current flowing through the N-type transistor N2 and the P-type transistor P2, thus turning on the P-type transistor P3. Meanwhile, the output signal VOUT changes from the low voltage level to the high voltage level, and thus the current I2 of the output stage associated with the comparator circuit 1 gradually increases. Last, after the time T1, the first input signal VIN is far less than the second input signal VIP, the output signal VOUT maintains the high voltage level stably, and the current I2 of the output stage associated with the comparator circuit 1 is stable.

From the above descriptions, it can be known that the current I2 of the output stage associated with the comparator circuit 1 generated before the output signal VOUT transits is not the same as that generated after the output signal VOUT transits. Under the condition the most electronic apparatuses operate in the high frequency, the output signal VOUT of the output stage associated with the comparator circuit 1 transits frequently, and the current output from the supply power VDDA is unstable, thus decreasing the lifetimes and voltage stabilities of the comparator circuit 1 and the supply power VDDA.

In addition to the above typical comparator circuit, the typical comparator circuit with the auto-zero function is also provided currently. Referring to FIG. 3, FIG. 3 is a circuit diagram of a typical comparator circuit with the auto-zero function. Compared to the comparator circuit 1 in FIG. 1, the comparator circuit 3 further has multiple P-type transistors PA1, PA2, multiple isolation capacitors C1 through C3, and an N-type transistor NA1. The gates of the P-type transistors PA1 and PA2 receive an inverted auto-zero control signal AZB of an auto-zero control signal AZ, the drains of the P-type transistors PA1 and PA2 are respectively electrically coupled to the drains of the N-type transistors N1 and N2, and the sources of the P-type transistors PA1 and PA2 are respectively electrically coupled to the gates of the N-type transistors N1 and N2. The gate of the N-type transistor NA1 receives the auto-zero control signal AZ, the drain of the N-type transistor NA1 is electrically coupled to the drain of the N-type transistor N4, and the source of the N-type transistor NA1 is electrically coupled to the gate of the N-type transistor N4. Additionally, the gates of the N-type transistors N1 and N2 respectively receive the first input signal VIN through the isolation capacitor C1 and the second input signal VIP through the isolation capacitor C2, and the gate of the N-type transistor N4 is electrically coupled to the grounding voltage GND through the isolation capacitor C3 rather than being electrically coupled to the bias signal VBIAS. By the above coupling manner, when the auto-zero control signal AZ is asserted, the output signal VOUT is reset to a predetermined voltage level (return to a zero level, for example), but the current I2 of the output stage associated with the comparator circuit 3 is a non-zero stable current. When the auto-zero control signal AZ is deasserted, the comparator circuit 3 is equivalent to the comparator circuit 1 of FIG. 1.

Referring to FIG. 3 and FIG. 4, FIG. 4 is a waveform diagram showing the first input signal, the second input signal, the current of the output stage, and the auto-zero control signal in the typical comparator circuit with the auto-zero function. The auto-zero control signal AZ is asserted (i.e. logically high) merely during the period from time t0 through t1. Meanwhile, the P-type transistors PA1, PA2, P3, and the N-type transistors NA1, N4 are turned on, the output signal is reset to the predetermined voltage level regardless the first input signal VIN and the second input signal VIP, and the current I2 of the output stage associated with comparator circuit 3 is the non-zero stable current. When the auto-zero control signal AZ is deasserted (i.e. logically low), the comparator circuit 3 is equivalent to the comparator circuit 1 of FIG. 1, thus the current I2 of the output stage associated with the comparator circuit 3 generated before the output signal VOUT transits is not the same as that generated after the output signal VOUT transits, the current output from the supply power VDDA is unstable, and the lifetimes and voltage stabilities of the comparator circuit 3 and the supply power VDDA are decreased.

SUMMARY

An exemplary embodiment of the present disclosure provides a surge current compensating circuit which capable of compensating a surge current drawn from a supply power after an output signal of a specific circuit transits. The surge current compensating circuit comprises a compensating current generation unit, a bias unit, and a switch unit. The compensating current generation unit is electrically coupled to an output stage of the specific circuit, and used to draw a compensating current from the supply power according to the output signal, wherein the compensating current substantially equals to the surge current, and a summation of a current flowing through the output stage of the specific circuit and the compensating current is substantially unchanged regardless whether the output signal transits or not. The bias unit is electrically coupled to the compensating current generation unit, and used to provide a bias to the compensating current generation unit to receive the compensating current passed through the compensating current generation unit or output the compensating current to the compensating current generation unit. The switch unit is electrically coupled between the compensating current and the bias unit. Before the output signal transits status, the switch unit is disabled (i.e. in off-status and not conduct current) and the compensating current generation unit is enabled, so as to draw the compensating current from the supply power. After the output signal transits status, the switch unit is enabled and the compensating current generation unit is disabled, such that the compensating current is not drawn from the supply power.

An exemplary embodiment of the present disclosure provides a comparator module comprising a comparator circuit and a surge current compensating circuit, wherein the surge current compensating circuit is used to compensate a surge current drawn from a supply power after an output signal of a comparator circuit transits, and comprises a compensating current generation unit, a bias unit, and a switch unit. The compensating current generation unit is electrically coupled to an output stage of the comparator circuit, and used to draw a compensating current from the supply power according to the output signal, wherein the compensating current substantially equals to the surge current, and a summation of a current flowing through the output stage of the comparator circuit and the compensating current is substantially unchanged regardless whether the output signal transits or not. The bias unit is electrically coupled to the compensating current generation unit, and used to provide a bias to the compensating current generation unit to receive the compensating current passed through the compensating current generation unit or output the compensating current to the compensating current generation unit. The switch unit is electrically coupled between the compensating current and the bias unit. Before the output signal transits status, the switch unit is disabled (i.e. in off-status and not conduct current) and the compensating current generation unit is enabled, so as to draw the compensating current from the supply power. After the output signal transits status, the switch unit is enabled and the compensating current generation unit is disabled, such that the compensating current is not drawn from the supply power.

To sum up, the surge current compensating circuit provided by the exemplary embodiment of the present disclosure can make the output current of the supply power generated before the output signal of the specific circuit transits substantially the same as that generated after the output signal of the specific circuit transits. In addition, the comparator module provided by the exemplary embodiment of the present disclosure using the above surge current compensating circuit, such that the output current of the supply power generated before the output signal of the comparator circuit transits is substantially the same as that generated after the output signal of the comparator circuit transits. Since the output current of the supply power generated before the output signal of the comparator circuit transits is substantially the same as that generated after the output signal of the comparator circuit transits, the surge current compensating circuit can be used to provide the stable voltage, and increase the lifetimes of the supply power, the specific circuit, and the comparator circuit.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
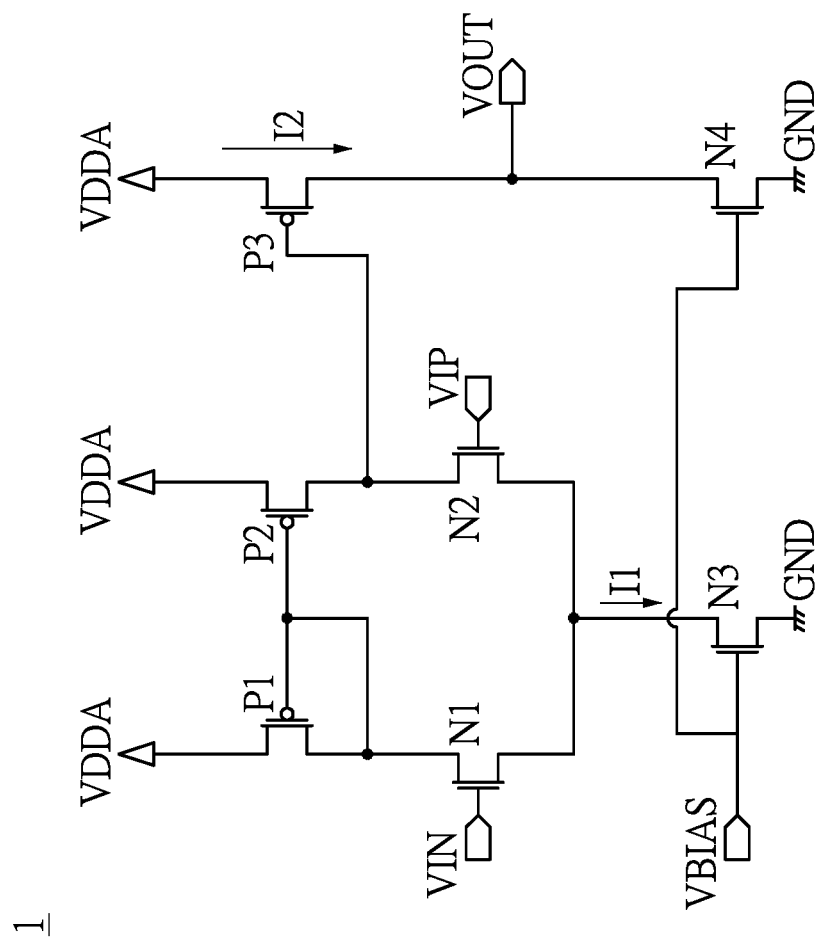
FIG. 1 is a circuit diagram of a typical comparator circuit.
Figure 2:
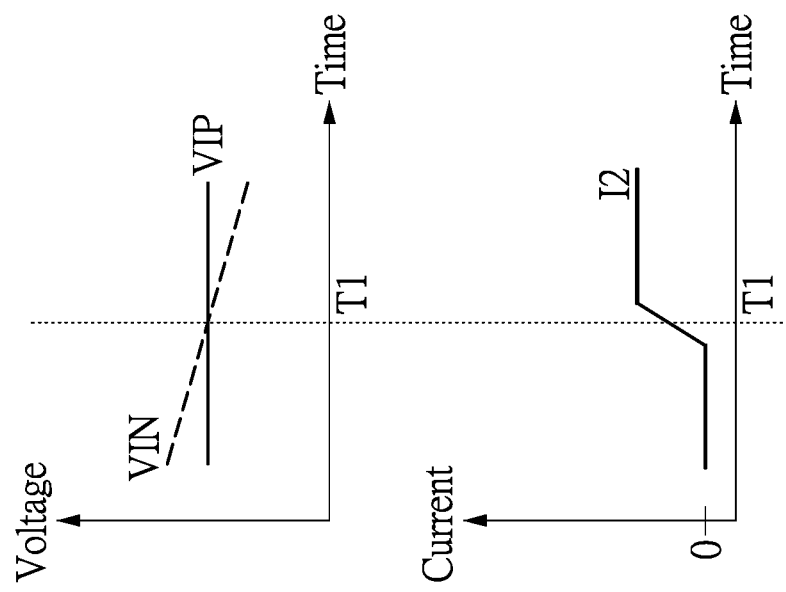
FIG. 2 is a waveform diagram showing the first input signal, the second input signal, and the current of the output stage in the typical comparator circuit.

The aforementioned illustrations and detailed descriptions are exemplarity for the purpose of further explaining the scope of the instant disclosure. Other objectives and advantages related to the instant disclosure will be illustrated in the subsequent descriptions and appended drawings.

An exemplary embodiment of the present disclosure provides a surge current compensating circuit for compensating a surge current drawn from a supply power after an output signal of a specific circuit transits. The surge current compensating circuit mainly has a compensating current generation unit and a bias unit. The compensating current generation unit draws a compensating current from the supply power according to the output signal of the output stage associated with the specific circuit, and the bias unit provides a bias to the compensating current generation unit. The compensating current is substantially the same as the surge current, such that summation of a current flowing through the output stage of the specific circuit and the compensating current is substantially unchanged regardless whether the output signal transits or not, and that is, the supply power outputs the stable current.

In one exemplary embodiment of the present disclosure, the specific circuit is a comparator circuit, but the present disclosure does not limit the specific circuit to be the comparator circuit. The comparator circuit and the surge current compensating circuit can form a comparator module. In addition, if the comparator circuit optionally has the auto-zero function, the surge current compensating circuit can further comprise an auto-zero detection unit. When the auto-zero control signal is deasserted (i.e. the auto-zero control signal is logically low and the inverted auto-zero control signal is logically high), the auto-zero function of the comparator circuit is disabled, and the auto-zero detection unit transmits the output signal of the comparator circuit to the compensating current generation unit, that is, the compensating current generation unit and the bias unit are not affected, and still make the summation of the current of the output stage associated with the specific circuit and the compensating current substantially unchanged regardless whether the output signal transits or not. By contrast, when the auto-zero control signal is asserted (i.e. the auto-zero control signal is logically low and the inverted auto-zero control signal is logically low), the auto-zero function of the comparator circuit is enabled, and the auto-zero detection unit disables the compensating current generation unit, to inhibit the compensating current generation unit from drawing the compensating current from the supply power. Thus, even the auto-zero function is enabled, the current output from the supply power is substantially the same as that when the auto-zero function is disabled.

Next, several exemplary embodiments accompanying with drawings are used to illustrate implementation details of the surge current compensating circuit and the comparator module using the surge current compensating circuit, and the person with ordinary skill in the art can know the following exemplary embodiments are not used to limit the present disclosure.

Figure 5:
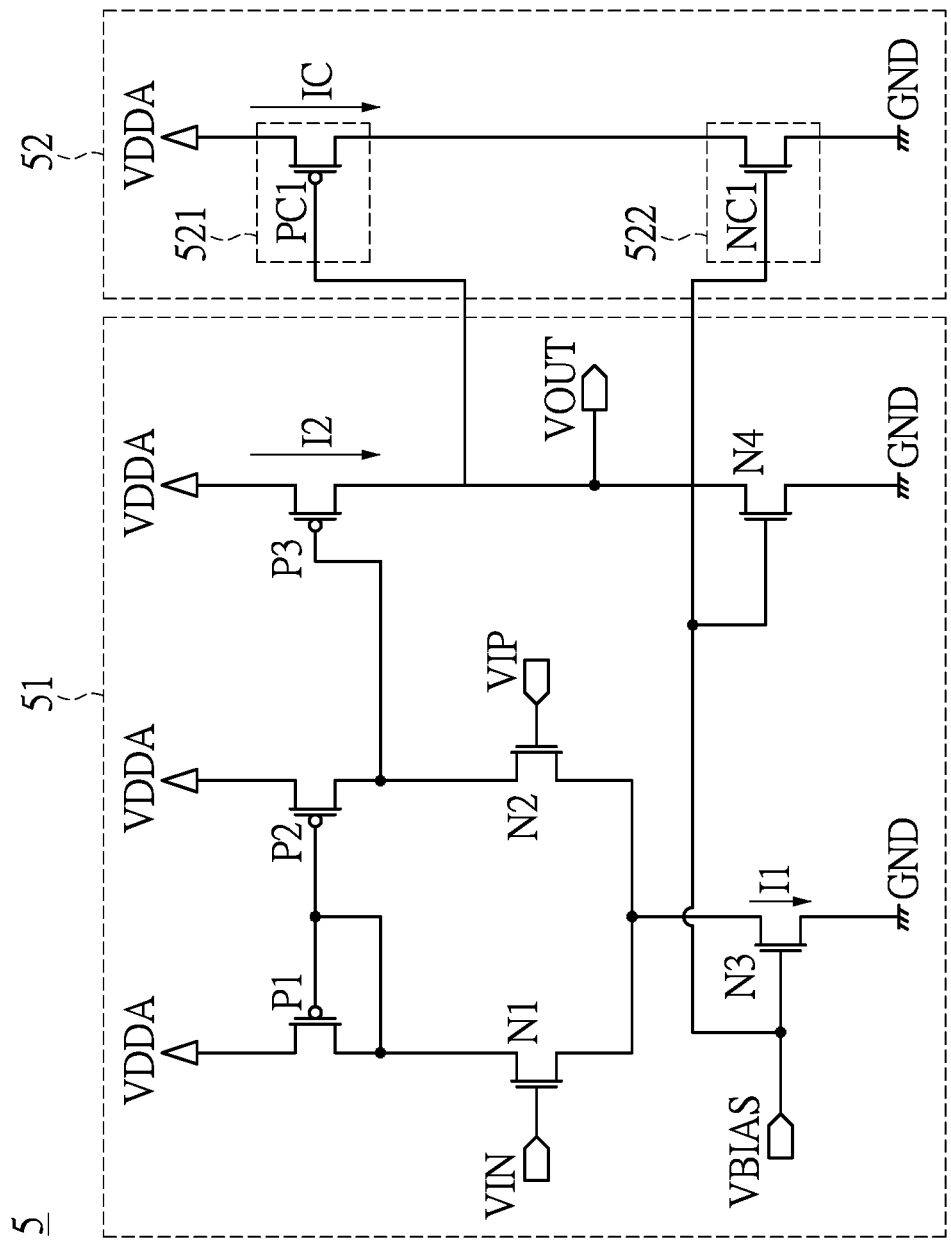
FIG. 5 is a circuit diagram of a comparator module according to an exemplary embodiment of the present disclosure.

Referring to FIG. 5, FIG. 5 is a circuit diagram of a comparator module according to an exemplary embodiment of the present disclosure. The comparator module 5 comprises a comparator circuit 51 and a surge current compensating circuit 52. The surge current compensating circuit is electrically coupled to the output stage of the comparator circuit 51, so as to compensate a surge current drawn from a supply power VDDA after an output signal of the comparator circuit 51 transits (such as changes to the high voltage level from the low voltage level). The comparator circuit 51 is a typical comparator circuit which can be the same as the comparator circuit 1 in FIG. 1, thus omitting the redundant descriptions. The surge current compensating circuit 52 comprises a compensating current generation unit 521 and a bias unit 522, wherein the compensating current generation unit 521 is electrically coupled to the output stage of the comparator circuit 51 and the supply power VDDA, and the bias unit 522 is electrically coupled to the compensating current generation unit 521 and used to receive the bias signal VBIAS.

The compensating current generation unit 521 draws the compensating current IC from the supply power VDDA according to the output signal VOUT, wherein the compensating current IC substantially the same as the surge current, and thus the summation of the current I2 of the output stage associated with the comparator circuit 51 and the compensating current IC is substantially unchanged regardless whether the output signal VOUT transits or not, i.e. the supply power VDDA outputs the stable current. The bias unit 522 provides the bias to the compensating current generation unit 521, so as to receive the compensating current IC flowing through the compensating current generation unit 521.

In the exemplary embodiment, the compensating current generation unit 521 is a P-type transistor PC1. The drain of the P-type transistor PC1 is electrically coupled to the bias unit 522, the source of the P-type transistor PC1 is electrically coupled to the supply power VDDA, the gate of the P-type transistor PC1 is used to receive the output signal VOUT. The P-type transistor PC1 is turned on or off (i.e. the compensating current generation unit 521 is enabled or disabled) according to the output signal VOUT, so as to draw the compensating current IC from the supply power VDDA accordingly.

Additionally, in the exemplary embodiment, the bias unit is an N-type transistor NC1. The drain of the N-type transistor NC1 is electrically coupled to the compensating current generation unit 521, the source of the N-type transistor NC1 is electrically coupled to the grounding voltage GND, and the gate of the N-type transistor NC1 is used to receive the bias signal VBIAS, such that the N-type transistor NC1 receives the compensating current IC flowing through the compensating current generation unit 521.

Figure 6:
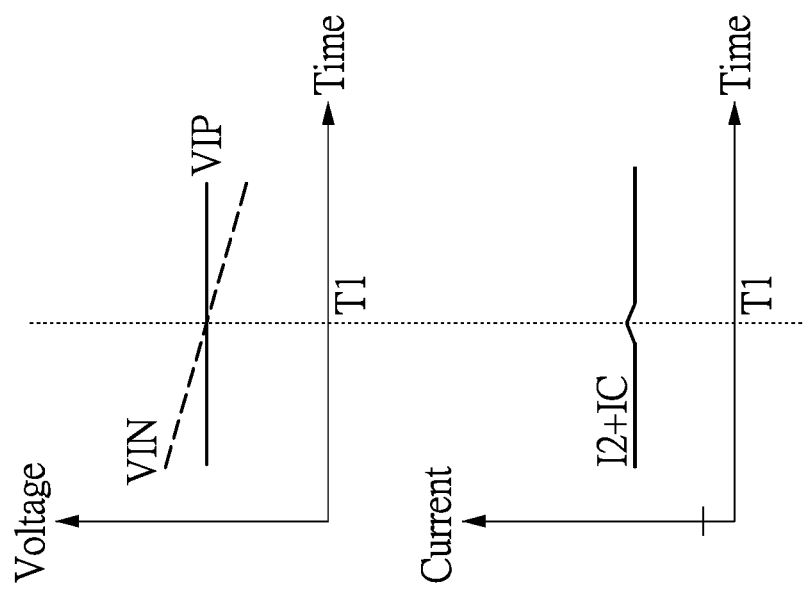
FIG. 6 is a waveform diagram showing the first input signal, the second input signal, and the summation of the current of the output stage in the comparator circuit and the compensating current according to an exemplary embodiment of the present disclosure.

Referring to both of FIG. 5 and FIG. 6, FIG. 6 is a waveform diagram showing the first input signal, the second input signal, and the summation of the current of the output stage in the comparator circuit and the compensating current according to an exemplary embodiment of the present disclosure. Before the output signal VOUT transits (i.e. before the time T1, the output signal VOUT is at the low voltage level, and the current I2 flowing through the output stage of the comparator circuit 51 is 0), the compensating current generation unit is enabled (P-type transistor PC1 is turned on), so as to draw the compensating current IC from the supply power VDDA. After the output signal VOUT (i.e. after time T1, the output signal VOUT is at the high voltage level), the compensating current generation unit 521 is disabled (P-type transistor PC1 is turned off), and thus does not draw the compensating current IC from the supply power VDDA (i.e. the compensating current IC is zero). By designing the ratios of the channel widths to channel lengths associated with the N-type transistors N4 and NC1, the compensating current IC generated before the output signal VOUT transits substantially equals to the current I2 of output stage associated with the comparator circuit 51 generated after the output signal VOUT transits, and thus the compensating current substantially equals to the surge current, and a summation of the current I2 flowing through the output stage of the comparator circuit 51 and the compensating current IC is substantially unchanged regardless whether the output signal VOUT transits or not.

Furthermore, by little modifying the coupling manner of the comparator circuit 5 in FIG. 5, the N-type transistors N1 through N4 can be replaced by multiple P-type transistors, and the P-type transistors P1 through P3 can be replaced by multiple N-type transistors. In the comparator module, the coupling manners of the compensating current generation unit and the bias unit in the surge current compensating circuit are modified correspondingly. The following descriptions illustrate the details of this comparator module.

Figure 7:
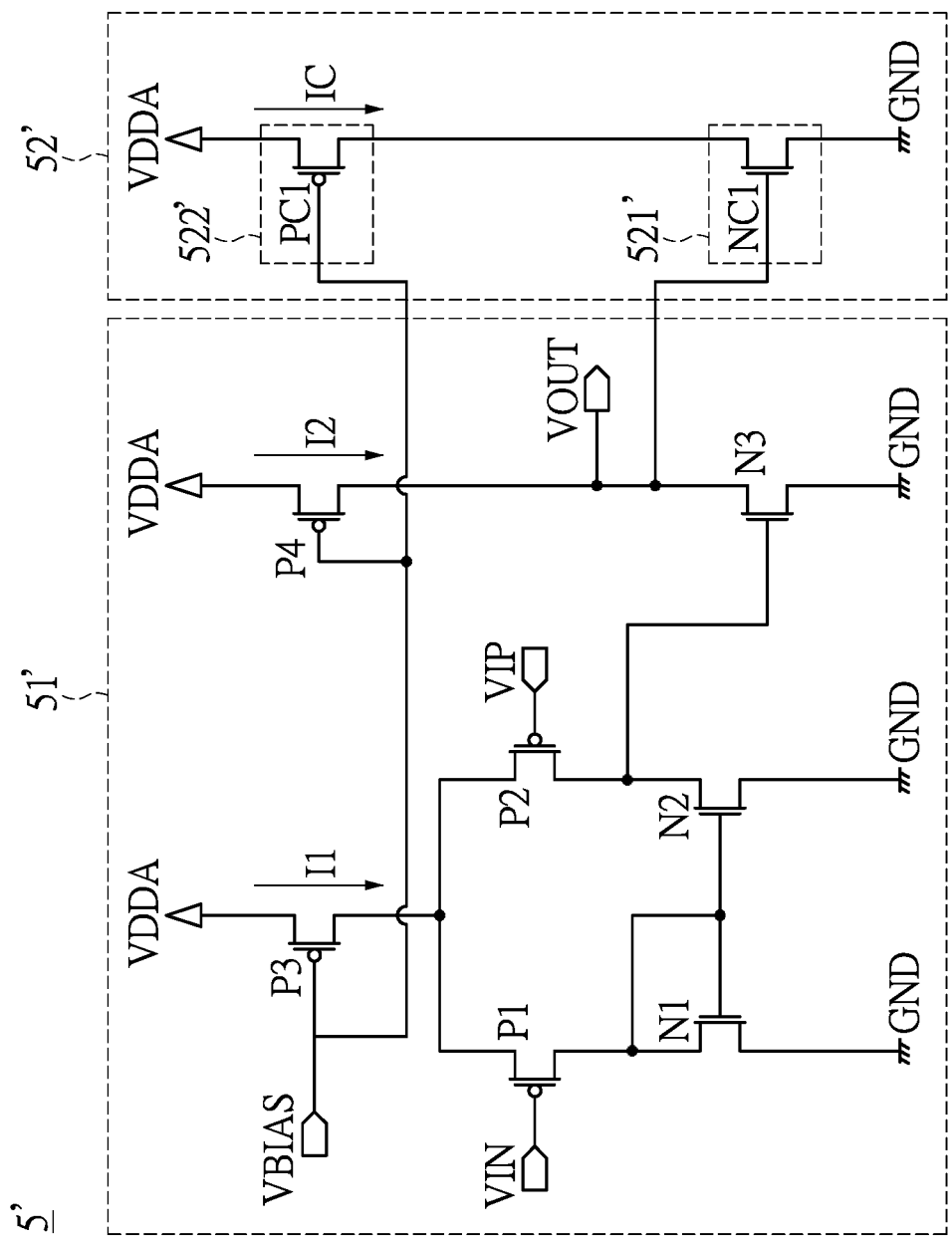
FIG. 7 is a circuit diagram of a comparator module according to one other exemplary embodiment of the present disclosure.

Referring to FIG. 7, FIG. 7 is a circuit diagram of a comparator module according to one other exemplary embodiment of the present disclosure. The comparator module 5' comprises a comparator circuit 51' and a surge current compensating circuit 52'. The comparator circuit 51' comprises multiple N-type transistors N1 through N3 and multiple P-type transistors P1 through P4. The sources of the N-type transistors N1 through N3 are electrically coupled to the grounding voltage GND, the sources of the P-type transistors P3, P4 are electrically coupled to the supply power VDDA, and the gates of the P-type transistors P3, P4 are used to receive the bias signal VBIAS. The gate of the N-type transistor N1 is electrically coupled to the gate of the N-type transistor N2, the drain of the N-type transistor N1, and the drain of the P-type transistor P1, the drain of the N-type transistor N2 is electrically coupled to the gate of the N-type transistor N3 and the drain of the P-type transistor P2, and the gates of the P-type transistors P1, P2 are used to respectively receive the first input signal VIN and the second input signal VIP. The sources of the P-type transistors P1, P2 are electrically coupled to the drain of the P-type transistor P3, and the drain of the P-type transistor P4 is electrically coupled to the drain of the N-type transistor N3 and the output stage of the comparator circuit 51' to generate the output signal VOUT. By the above coupling manner, the P-type transistors P1 through P3 and the N-type transistors N1, N2 form a differential input stage, and the P-type transistor P4 and the N-type transistor N3 form the output stage.

The surge current compensating circuit 52' comprises a compensating current generation unit 521' and a bias unit 522'. In the exemplary embodiment, the compensating current generation unit 521' is electrically coupled to the output stage of the comparator circuit 51' and the grounding voltage GND, and the bias unit 522' is electrically coupled to the compensating current generation unit 521' and used to receive the bias signal VBIAS. Being different from the surge current compensating circuit 52 in FIG. 5, the bias unit 522' is used to output the compensating current IC to the compensating current generation unit 521'. Thus, the compensating current generation unit 521' and the bias unit 522' are respectively the N-type transistor NC1 and the P-type transistor PC1.

The drain of the N-type transistor NC1 is electrically coupled to the bias unit 522', the source of the N-type transistor NC1 is electrically coupled to the grounding voltage GND, and the gate of the N-type transistor NC1 is used to receive the output signal VOUT. The N-type transistor NC1 is turned on or off (i.e. the compensating current generation unit 521' is enabled or disabled) according to the output signal VOUT, and draws the compensating current IC from the supply power VDDA accordingly. The drain of the P-type transistor PC1 is electrically coupled to the compensating current generation unit 521', the source of the P-type transistor PC1 is electrically coupled to the supply power VDDA, and the gate of the P-type transistor PC1 is used to receive the bias signal VBIAS, such that the P-type transistor PC1 outputs the compensating current IC flowing through compensating current generation unit 521'.

By the way, in addition to the above comparator module, exemplary embodiments of the present disclosure further provide the comparator modules with the auto-zero functions. In the comparator module with the auto-zero function, the surge current compensating circuit further has an auto-zero detection unit. Next, the following descriptions illustrate the details of this comparator module.

Figure 3:
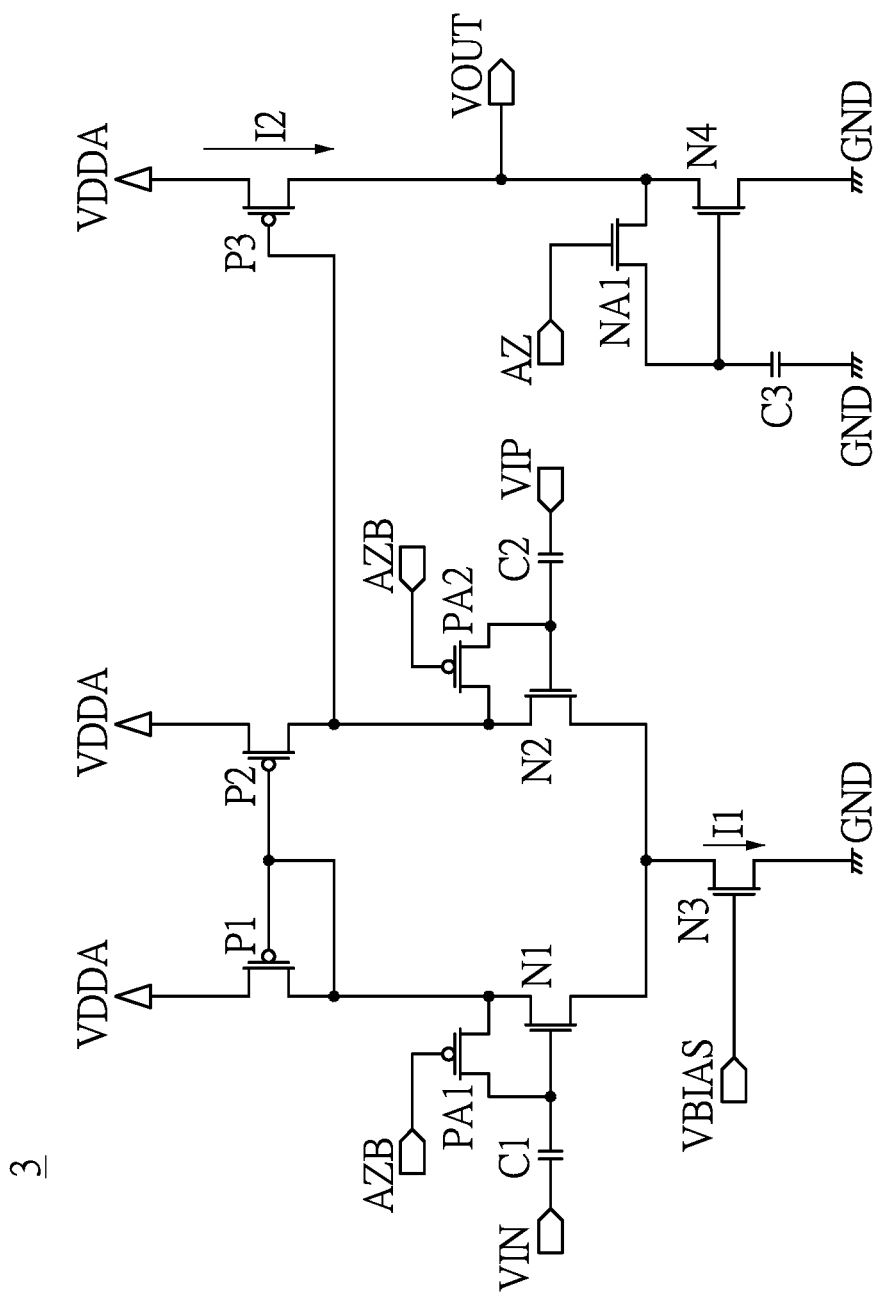
FIG. 3 is a circuit diagram of a typical comparator circuit with the auto-zero function.
Figure 4:
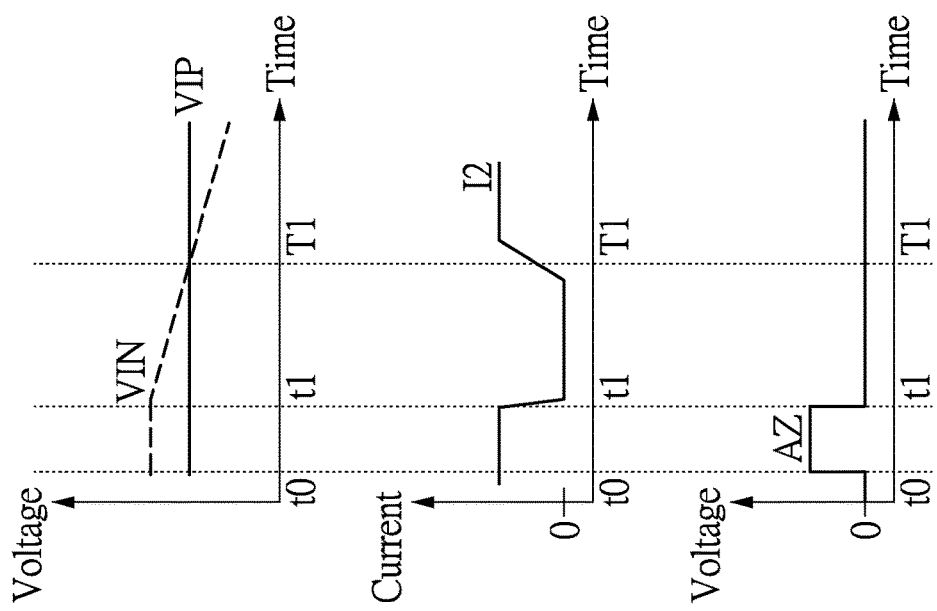
FIG. 4 is a waveform diagram showing the first input signal, the second input signal, the current of the output stage, and the auto-zero control signal in the typical comparator circuit with the auto-zero function.
Figure 8:
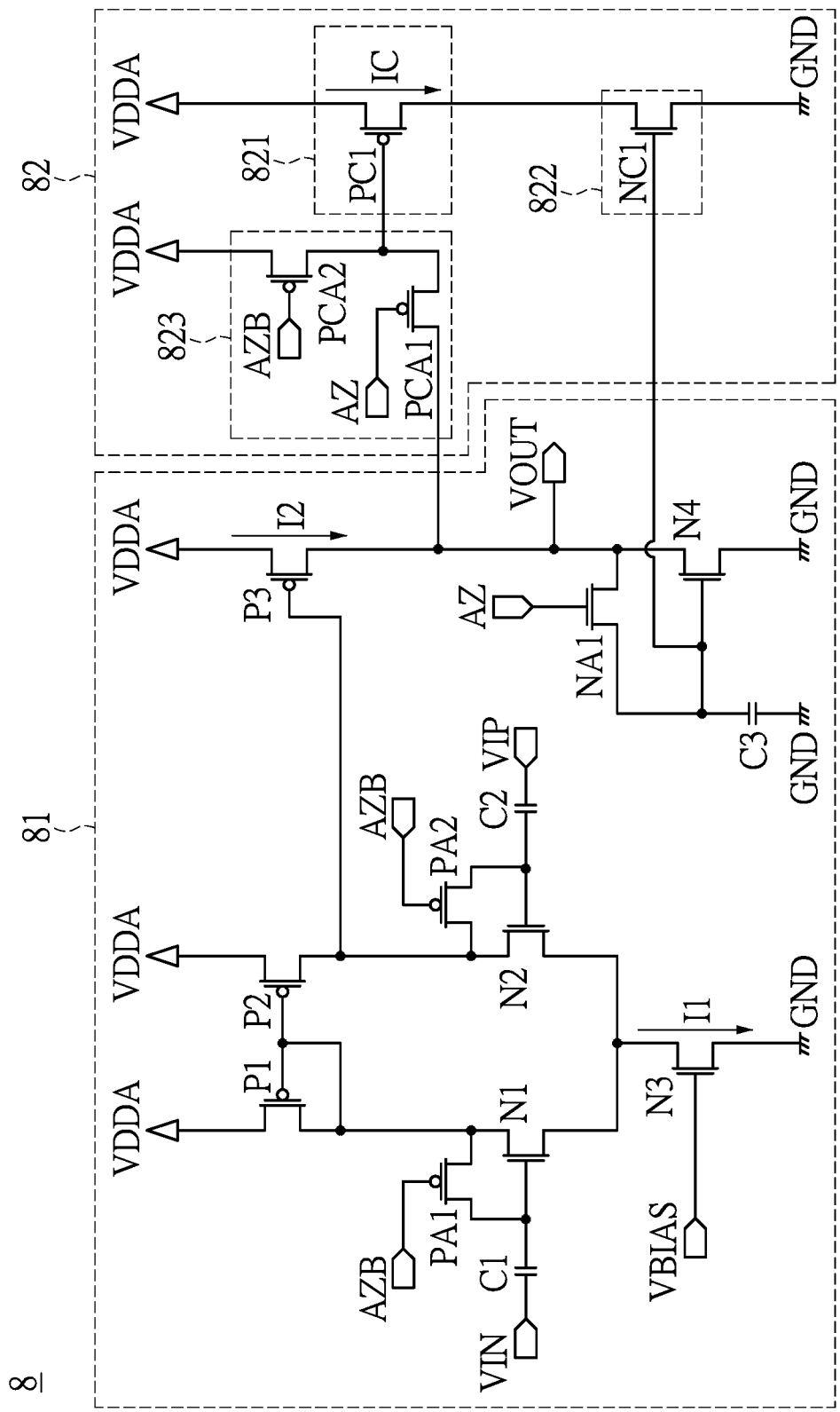
FIG. 8 is a circuit diagram of a comparator module with the auto-zero function according to an exemplary embodiment of the present disclosure.

Referring to FIG. 8, FIG. 8 is a circuit diagram of a comparator module with the auto-zero function according to an exemplary embodiment of the present disclosure. The comparator module 8 comprises a comparator circuit 81 and a surge current compensating circuit 82. The comparator circuit 81 has the auto-zero function, and is the same as the comparator circuit 3 in FIG. 3, thus omitting redundant descriptions.

Compared to the surge current compensating circuit 52 in FIG. 5, the surge current compensating circuit 82 comprises not only the compensating current generation unit 821 and the bias unit 822, but also the auto-zero detection unit 823. The compensating current generation unit 821 and the bias unit 822 respectively function as the compensating current generation unit 521 and the bias unit 522 in FIG. 5, thus the redundant descriptions are omitted, and merely the differences are illustrated herein. Being different from the bias unit 522 in FIG. 5, the gate of the N-type transistor NC1 associated with the bias unit 822 is electrically coupled to the grounding voltage GND through the isolation capacitor C3, and the auto-zero detection unit 823 is electrically coupled between the output stage of the comparator circuit 81 and the gate of the P-type transistor PC1 associated with the compensating current generation unit 821.

Figure 9:
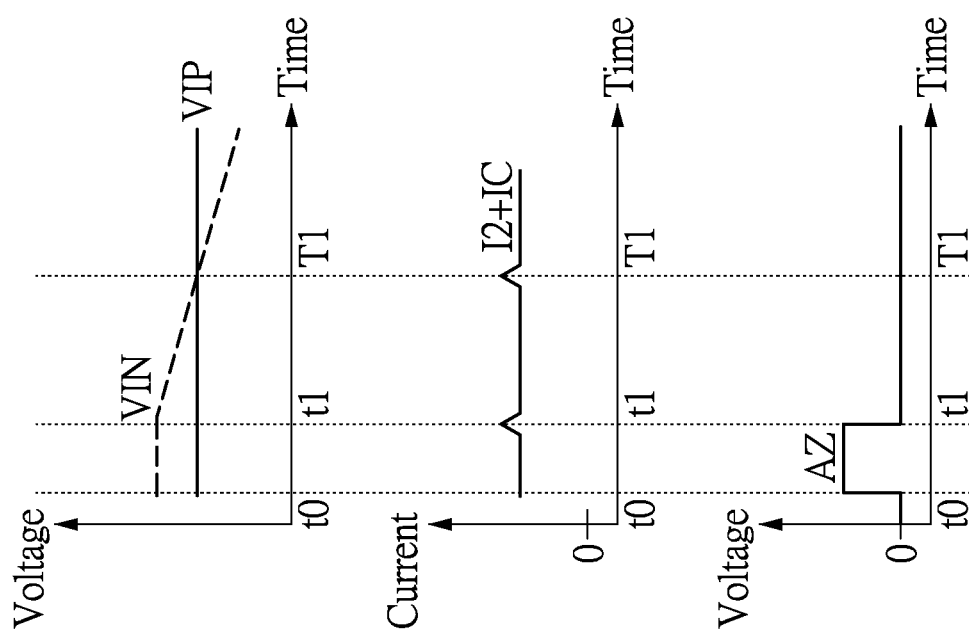
FIG. 9 is a waveform diagram showing the first input signal, the second input signal, the summation of the current of the output stage in the comparator circuit with the auto-zero function and the compensating current, and the auto-zero control signal according to an exemplary embodiment of the present disclosure.

Referring to both of FIG. 8 and FIG. 9, FIG. 9 is a waveform diagram showing the first input signal, the second input signal, the summation of the current of the output stage in the comparator circuit with the auto-zero function and the compensating current, and the auto-zero control signal according to an exemplary embodiment of the present disclosure. When the auto-zero control signal AZ is logically low and the inverted auto-zero control signal AZB is logically high (as shown in FIG. 9, the period between times t1 and T1), the auto-zero function of the comparator circuit 81 is disabled, the auto-zero detection unit 823 transmits the output signal VOUT to the compensating current generation unit. Meanwhile, the comparator module 8 is equivalent to the comparator module 5 in FIG. 5, and the surge current compensating circuit 82 makes the current output from the supply power VDDA generated before the output signal VOUT transits substantially the same as that generated after the output signal VOUT transits, that is, the summation of the current I2 flowing through the output stage of the comparator circuit 81 and the compensating current IC is substantially unchanged regardless whether the output signal VOUT transits or not.

When the auto-zero control signal AZ is logically high and the inverted auto-zero control signal AZB is logically low, the auto-zero function of the comparator circuit 81 is enabled (as shown in FIG. 9, as the period between times t0 and t1), the auto-zero detection unit 823 is used to disable the compensating current generation unit 821 (i.e. the P-type transistor PC1 is turned off), so as to inhibit the compensating current generation unit 821 from drawing the compensating current IC from the supply power VDDA (i.e. make the compensating current IC be zero). When the auto-zero function is enabled, the current I2 flowing through the output stage of the comparator circuit 81 is substantially the same as the current I2 flowing through the output stage of the comparator circuit 81 generated when the auto-zero function is disabled. Thus, the compensating current generation unit 821 should be inhibited from drawing the compensating current IC from the supply power VDDA, so as to make the current I2 flowing through the output stage of the comparator circuit 81 substantially unchanged regardless whether the auto-zero function is enabled or disabled.

Still referring FIG. 8, one implementation of the auto-zero detection unit 823 is illustrated, and the person with ordinary skill in the art can know the following implementation of the auto-zero detection unit 823 is not used to limit the present disclosure. The auto-zero detection unit 823 comprises two P-type transistors PCA1 and PCA2. The drain of the P-type transistor PCA1 is electrically coupled to the compensating current generation unit 821, the source of the P-type transistor PCA1 is used to receive the output signal VOUT, and the gate of the P-type transistor PCA1 is used to receive the auto-zero control signal AZ. The drain of the P-type transistor PCA2 is electrically coupled to the compensating current generation unit 821 and the drain of the P-type transistor PCA1, the source of the P-type transistor PCA2 is electrically coupled to the supply power VDDA, and the gate of the P-type transistor PCA2 is used to receive the inverted auto-zero control signal AZB.

When the auto-zero control signal AZ is logically low and the inverted auto-zero control signal AZB is logically high, the P-type transistor PCA1 is turned on, and the P-type transistor PCA2 is turned off, such that the output signal VOUT is transmitted to the compensating current generation unit 821. When the auto-zero control signal AZ is logically high and the inverted auto-zero control signal AZB is logically low, the P-type transistor PCA1 is turned off, and the P-type transistor PCA2 is turned on, such that the compensating current generation unit 821 is disabled.

Furthermore, by little modifying the coupling manner of the comparator circuit 8 in FIG. 8, the N-type transistors N1 through N4 can be replaced by multiple P-type transistors, and the P-type transistors P1 through P3 can be replaced by multiple N-type transistors. In addition, in the comparator module with the auto-zero function, the coupling manners of the compensating current generation unit and the bias unit in the surge current compensating circuit are modified correspondingly. The following descriptions illustrate the details of this comparator module with the auto-zero function.

Figure 10:
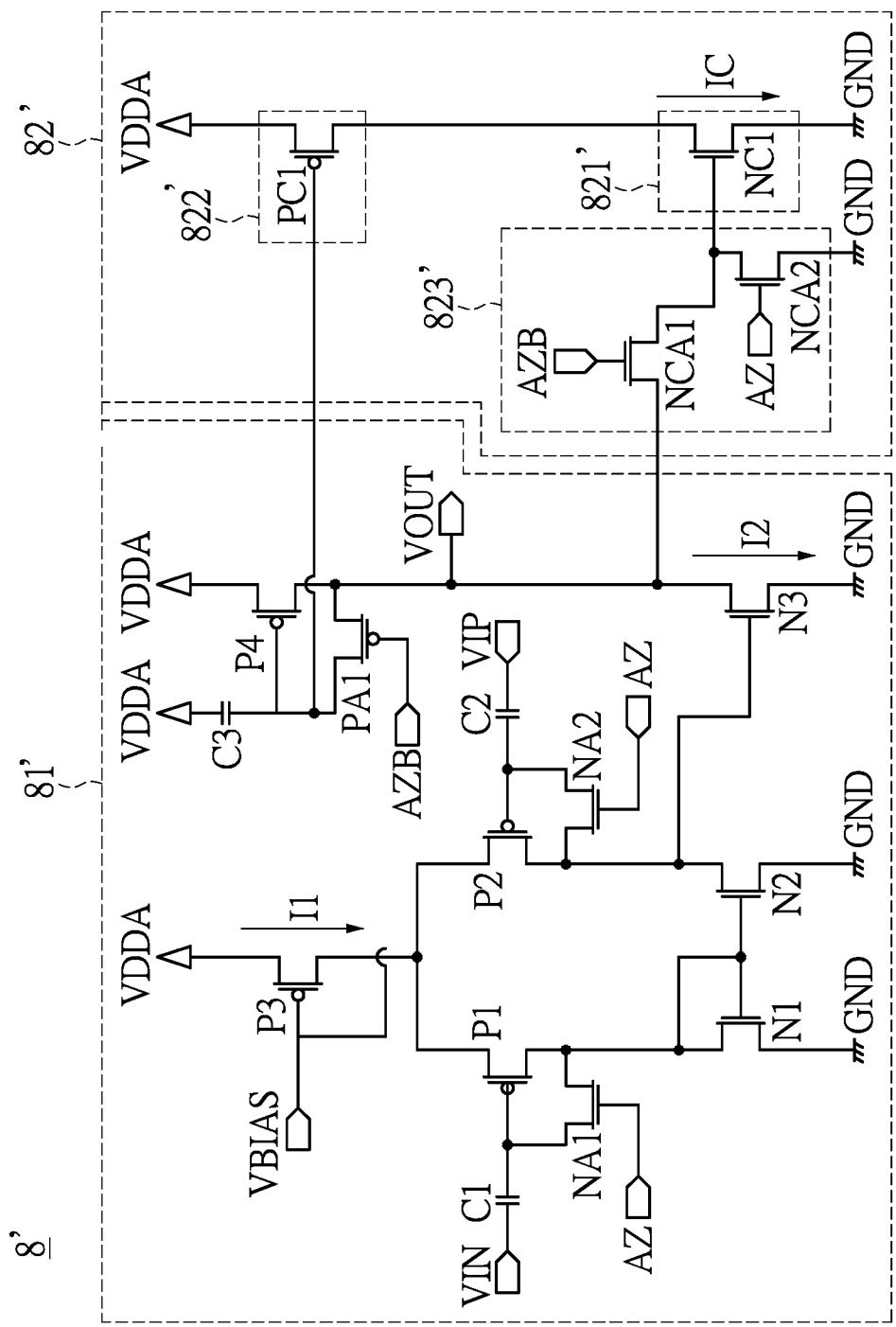
FIG. 10 is a circuit diagram of a comparator module with the auto-zero function according to one other exemplary embodiment of the present disclosure.

Referring to FIG. 10, FIG. 10 is a circuit diagram of a comparator module with the auto-zero function according to one other exemplary embodiment of the present disclosure. The comparator module 8' comprises a comparator circuit 81' and a surge current compensating circuit 82'. The comparator circuit 81' is similar to the comparator circuit 51' in FIG. 7, but further has multiple isolation capacitors C1 through C3, multiple N-type transistors NA1, NA2, and a P-type transistor PA1. The gates of the N-type transistors NA1, NA2 are used to receive the auto-zero control signal AZ, the drains of the N-type transistors NA1, NA2 are respectively electrically coupled to the drains of the P-type transistors P1, P2, and the sources of the N-type transistors NA1, NA2 are respectively electrically coupled to the gates of the P-type transistors P1, P2. The gate of the P-type transistor PA1 is used to receive the inverted auto-zero control signal AZB, the drain of the P-type transistor PA1 is electrically coupled to the drain of the P-type transistor P4, and the source of the P-type transistor PA1 is electrically is electrically coupled to the gate of P-type transistor P4. Moreover, the gates P-type transistors P1, P2 are used to respectively receive the first input signal VIN and the second input signal VIP through the isolation capacitors C1 and C2, and the gate of the P-type transistor P4 is not directly electrically coupled to the bias signal VIBAS, but electrically coupled to the supply power VDDA through the isolation capacitor C3.

The surge current compensating circuit 82' comprises a compensating current generation unit 821', a bias unit 822', and an auto-zero detection unit 823'. Functions and implementations of the compensating current generation unit 821' and the bias unit 822' are respectively similar to those of the compensating current generation unit 521' and bias unit 522' in FIG. 5, but the gate of the P-type transistor PC1 associated with the bias unit 822' is not used to receive the bias signal VBIAS, and instead electrically coupled to the supply power VDDA through the isolation capacitor C3.

The function of the auto-zero detection unit 823' is similar to that of the auto-zero detection unit 823 in FIG. 8, but the implementations of auto-zero detection units 823, 823' have little difference therebetween. The auto-zero detection unit 823' comprises multiple N-type transistors NCA1 and NCA2. The drain of the N-type transistor NCA1 is electrically coupled to the compensating current generation unit 821', the source of the N-type transistor NCA1 is used to receive the output signal VOUT, and the gate of the N-type transistor NCA1 is used to receive the inverted auto-zero control signal AZB. The drain of the N-type transistor NCA2 is electrically coupled to the compensating current generation unit 821' and the drain of the N-type transistor NCA1, the source of the N-type transistor NCA2 is electrically coupled to the grounding voltage GND, and the gate of the N-type transistor NCA2 is used to receive the auto-zero control signal AZ.

When the auto-zero control signal AZ is logically low and the inverted auto-zero control signal AZB is logically high, the N-type transistor NCA1 is turned on, and the N-type transistor NCA2 is turned off, such that the output signal VOUT is transmitted to the compensating current generation unit 821'. When the auto-zero control signal AZ is logically high and the inverted auto-zero control signal AZB is logically low, the N-type transistor NCA1 is turned off, and the N-type transistor NCA2 is turned on, so as to disable the compensating current generation unit 821'.

Figure 11:
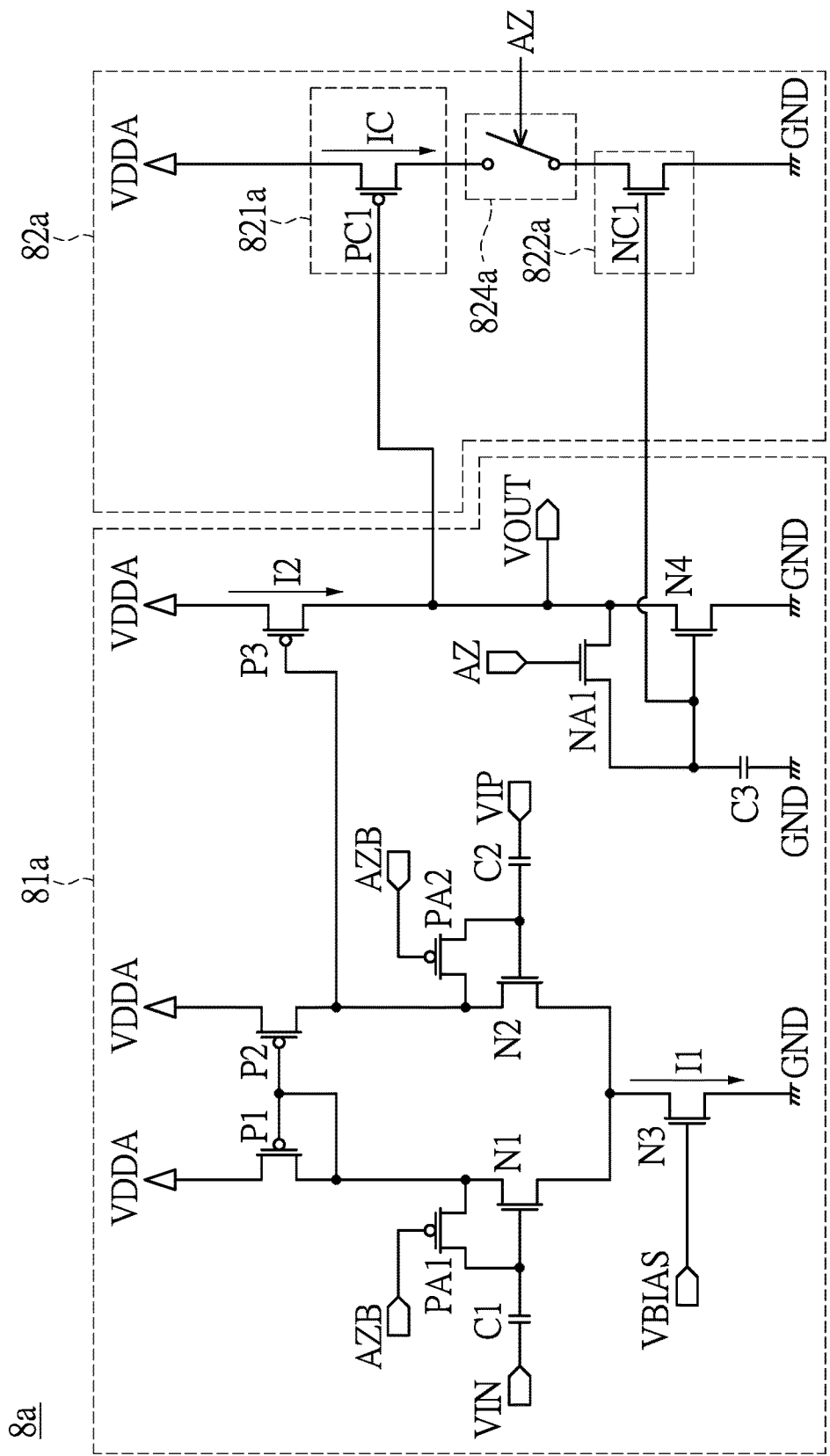
FIG. 11 is a circuit diagram of a comparator module with the auto-zero function according to one other exemplary embodiment of the present disclosure.

FIG. 11 shows a circuit diagram of a comparator module with the auto-zero function according to one other exemplary embodiment of the present disclosure. The comparator module 8a includes a comparator circuit 81a and a surge current compensating circuit 82a. The comparator circuit 81a has the auto-zero function, and is the same as the comparator circuit 3 in FIG. 3, thus omitting redundant descriptions.

Compared to the surge current compensating circuit 82 in FIG. 8, the surge current compensating circuit 82a includes not only the compensating current generation unit 821a and the bias unit 822a, but also a switch unit 824a instead of the auto-zero detection unit 823. The compensating current generation unit 821a and the bias unit 822a respectively function as the compensating current generation unit 821 and the bias unit 822 in FIG. 8, thus the redundant descriptions are omitted, and merely the differences are illustrated herein. As shown in FIG. 11, the compensating current generation unit 821a is electrically coupled to the output stage of the comparator circuit 81a and the supply power VDDA. The switch unit 824a is electrically coupled between the compensating current generation unit 821a and the bias unit 822a. In the present disclosure, the compensating current generation unit 821a is a P-type transistor PC1. A drain of the P-type transistor PC1 is electrically coupled to the switch unit 824a. A source of the P-type transistor PC1 is electrically coupled to the power supply VDDA. A gate of the P-type transistor PC1 is used to receive the output signal VOUT. The P-type transistor PC1 is turned on or off (i.e. the compensating current generation unit 821a is enabled or disabled) according to the output signal VOUT, and draws the compensating current IC from the supply power VDDA accordingly.

Before the output signal VOUT transits, the switch unit 824a is disabled and the compensating current generation unit 821a is enabled, so as to draw the compensating current IC from the supply power VDDA. After the output signal VOUT transits, the switch unit 824a is enabled and the compensating current generation unit 821a is disabled, such that the compensating current IC is not drawn from the supply power VDDA. When the switch unit 824a is disabled, the auto-zero function of the comparator circuit 81a is disabled and the compensating current generation unit is enabled according to the output signal VOUT. When the switch unit 824a is enabled, the auto-zero function of the comparator circuit 81a is enabled and the compensating current generation unit is disabled according to the output signal VOUT, to inhibit the compensating current generation unit 821a from drawing the compensating current IC from the supply power VDDA.

In the present disclosure, the switch unit 824a can be disabled or enabled according to the auto-zero control signal AZ or the inverted auto-zero control signal AZB. The switch unit 824a being disabled or enabled according to the auto-zero control signal AZ is taken as an example in this embodiment for illustration. When the auto-zero control signal AZ is logically low and the inverted auto-zero control signal AZB is logically high, the switch unit 824a is disabled (i.e., the switch unit 824a is turned off). At this time, the auto-zero function of the comparator circuit 81a is disabled and the compensating current generation unit 821a is enabled according to the output signal VOUT (i.e., the p-type transistor PC1 is turned on). The comparator module 8a is equivalent to the comparator module 8 in FIG. 5, and the surge current compensating circuit 82a makes the current output from the supply power VDDA generated before the output signal VOUT transits substantially the same as that generated after the output signal VOUT transits, that is, the summation of the current I2 flowing through the output stage of the comparator circuit 81a and the compensating current IC is substantially unchanged regardless whether the output signal VOUT transits or not.

When the auto-zero control signal AZ is logically high and the inverted auto-zero control signal AZB is logically low, the switch unit 824a is enabled (i.e., the switch unit 824a is turned on). At this time, the auto-zero function of the comparator circuit 81a is enabled and the compensating current generation unit 821a is disabled according to the output signal VOUT (i.e., the p-type transistor PC1 is turned off), so as to inhibit the compensating current generation unit 821a from drawing the compensating current IC from the supply power VDDA (i.e. make the compensating current IC be zero). When the auto-zero function is enabled, the current I2 flowing through the output stage of the comparator circuit 81a is substantially the same as the current I2 flowing through the output stage of the comparator circuit 81a generated when the auto-zero function is disabled. Thus, the compensating current generation unit 821a should be inhibited from drawing the compensating current IC from the supply power VDDA, so as to make the current I2 flowing through the output stage of the comparator circuit 81a substantially unchanged regardless whether the auto-zero function is enabled or disabled.

Figure 12:
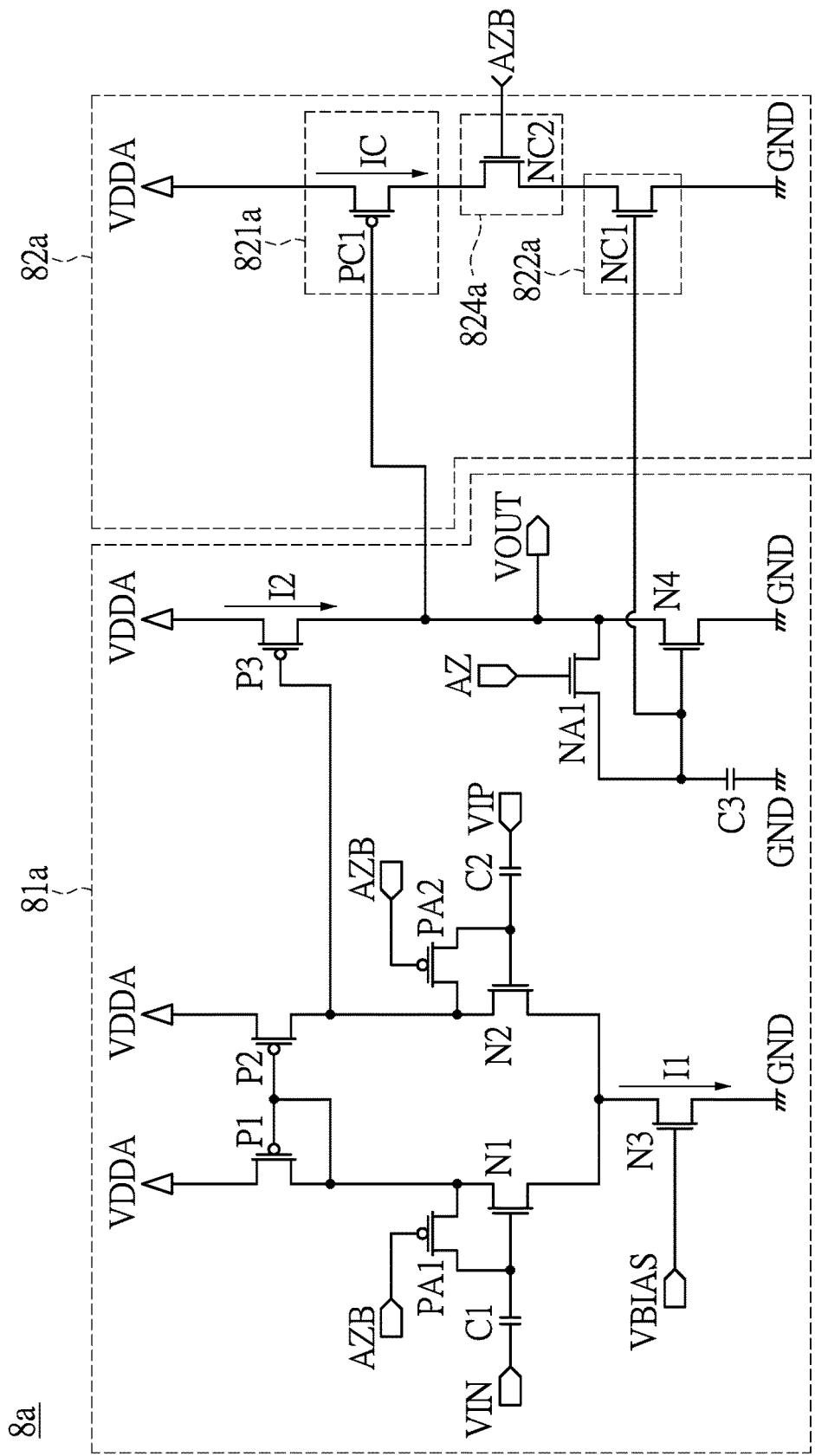
FIG. 12 is a circuit diagram of a comparator module with the auto-zero function according to one other exemplary embodiment of the present disclosure.

Still referring FIG. 12, one implementation of the switch unit is illustrated, and the person with ordinary skill in the art can know the following implementation of the switch unit is not used to limit the present disclosure. As shown in FIG. 12, the switch unit 824a is an N-type transistor NC2 and the N-type transistor NC2 receives the inverted auto-zero control signal AZB.

When the auto-zero control signal AZ is logically high and the inverted auto-zero control signal AZB is logically low, the N-type transistor NC2 is turned off. At this time, the auto-zero function of the comparator circuit 81a is disabled. The compensating current generation unit 821a is enabled according to the output signal VOUT (i.e., the P-type transistor PC1 is turned on), so as to draw the compensating current IC from the supply power VDDA. When the auto-zero control signal AZ is logically low and the inverted auto-zero control signal AZB is logically high, the N-type transistor NC2 is turned on. At this time, the auto-zero function of the comparator circuit 81a is enabled. The compensating current generation unit 821a is disabled according to the output signal VOUT (i.e., the P-type transistor PC1 is turned off), to inhibit the compensating current generation unit 821a from drawing the compensating current IC from the supply power VDDA.

Furthermore, by little modifying the coupling manner of the comparator circuit 81a in FIG. 12, the N-type transistors N1 through N4 can be replaced by multiple P-type transistors, and the P-type transistors P1 through P3 can be replaced by multiple N-type transistors. In addition, in the comparator module with the auto-zero function, the coupling manners of the compensating current generation unit and the bias unit in the surge current compensating circuit are modified correspondingly. The following descriptions illustrate the details of this comparator module with the auto-zero function.

Figure 13:
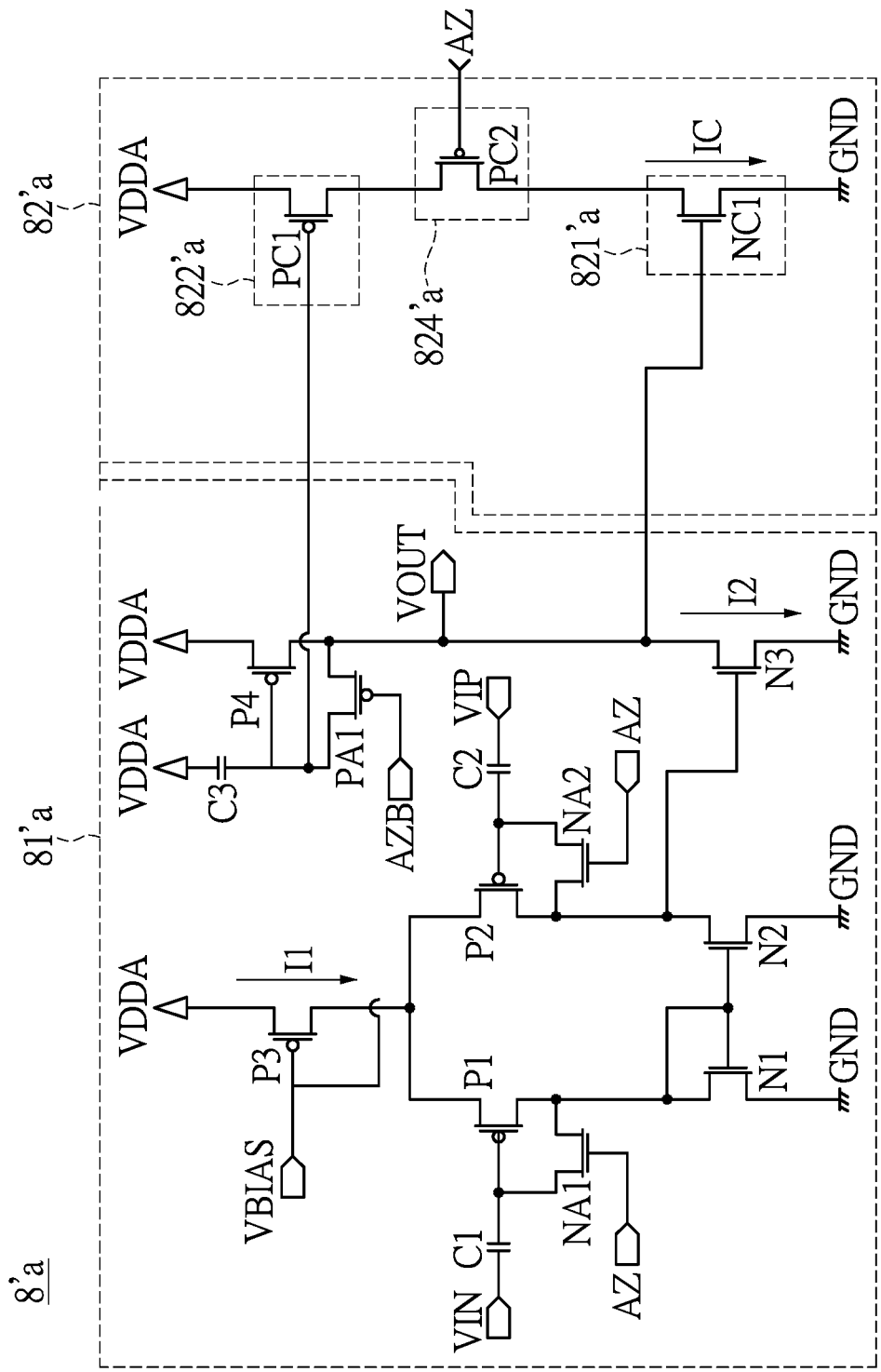
FIG. 13 is a circuit diagram of a comparator module with the auto-zero function according to one other exemplary embodiment of the present disclosure.

Still referring FIG. 13, one implementation of the switch unit is illustrated. The comparator module 8'a includes a comparator circuit 81'a and a surge current compensating circuit 82'a. The comparator circuit 81'a is similar to the comparator circuit 81' in FIG. 10, thus omitting redundant descriptions. Compared to the surge current compensating circuit 82' in FIG. 10, the surge current compensating circuit 82'a includes not only the compensating current generation unit 821'a and the bias unit 822'a, but also a switch unit 824'a instead of the auto-zero detection unit 823'. The compensating current generation unit 821'a and the bias unit 822'a respectively function as the compensating current generation unit 821' and the bias unit 822' in FIG. 10, thus the redundant descriptions are omitted, and merely the differences are illustrated herein.

As shown in FIG. 13, the compensating current generation unit 821'a is electrically coupled to the output stage of the comparator circuit 81'a and the grounding voltage GND. The switch unit 824'a is electrically coupled between the compensating current generation unit 821'a and the bias unit 822'a. In the present disclosure, the compensating current generation unit 821'a is a N-type transistor NC1. A drain of the N-type transistor NC1 is electrically coupled to the switch unit 824'a. A source of the N-type transistor NC1 is electrically coupled to the grounding voltage GND. A gate of the N-type transistor NC1 is used to receive the output signal VOUT. The N-type transistor NC1 is turned on or off (i.e. the compensating current generation unit 821'a is enabled or disabled) according to the output signal VOUT, and draws the compensating current IC from the supply power VDDA accordingly.

Besides, as shown in FIG. 13, the switch unit 826'a is a P-type transistor PC2 and the P-type transistor PC2 receives the auto-zero control signal AZ. Therefore, when the auto-zero control signal AZ is logically high and the inverted auto-zero control signal AZB is logically low, the P-type transistor PC2 is turned off. At this time, the auto-zero function of the comparator circuit 81'a is disabled. The compensating current generation unit 821'a is enabled according to the output signal VOUT (i.e., the N-type transistor NC1 is turned on), so as to draw the compensating current IC from the supply power VDDA. When the auto-zero control signal AZ is logically low and the inverted auto-zero control signal AZB is logically high, the P-type transistor PC2 is turned on. At this time, the auto-zero function of the comparator circuit 81'a is enabled. The compensating current generation unit 821'a is disabled according to the output signal VOUT (i.e., the N-type transistor NC1 is turned off), to inhibit the compensating current generation unit 821'a from drawing the compensating current IC from the supply power VDDA.

Accordingly, the surge current compensating circuit provided by the exemplary embodiment of the present disclosure can make the output current of the supply power generated before the output signal of the specific circuit transits substantially the same as that generated after the output signal of the specific circuit transits. Thus, under the condition that the specific circuit operates at high frequency, the output current of the supply power has little variation, such that the lifetimes and operation stabilities of the specific circuit and the supply power can be enhanced. In addition, the comparator module provided by the exemplary embodiment of the present disclosure using the above surge current compensating circuit, and the comparator module can even have the auto-zero function. In the comparator module, the output current of the supply power generated before the output signal of the comparator circuit transits is substantially the same as that generated after the output signal of the comparator circuit transits, and thus the comparator module can be used in the high frequency operation electronic apparatus, and the lifetime of the operation stability of the comparator module are longer than those of the conventional comparator circuit.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A surge current compensating circuit, for compensating a surge current drawn from a supply power after an output signal of a specific circuit transits, comprising: a compensating current generation unit, electrically coupled to an output stage of the specific circuit, for drawing a compensating current from the supply power according to the output signal, wherein the compensating current substantially equals to the surge current, and a summation of a current flowing through the output stage of the specific circuit and the compensating current is substantially unchanged regardless whether the output signal transits or not; a bias unit, electrically coupled to the compensating current generation unit, for providing a bias to the compensating current generation unit to receive the compensating current passed through the compensating current generation unit or output the compensating current to the compensating current generation unit; and a switch unit, electrically coupled between the compensating current generation unit and the bias unit; wherein before the output signal transits, the switch unit is disabled and the compensating current generation unit is enabled, so as to draw the compensating current from the supply power; wherein after the output signal transits, the switch unit is enabled and the compensating current generation unit is disabled, such that the compensating current is not drawn from the supply power.

2. The surge current compensating circuit according to claim 1, wherein the specific circuit is a comparator circuit.

3. The surge current compensating circuit according to claim 1, wherein the compensating current generation unit is a first transistor, a drain of the first transistor is electrically coupled to the bias circuit through the switch unit, a source of the first transistor is electrically coupled to the supply power or a grounding voltage, a gate of the first transistor receives the output signal, and the first transistor is turned on or off according to the output signal, so as to draw the compensating current from the supply power correspondingly.

4. The surge current compensating circuit according to claim 1, wherein the bias circuit is a second transistor, a drain of the second transistor is electrically coupled to the compensating current generation unit through the switch unit, a source of the second transistor is electrically coupled to a grounding voltage or the supply power, a gate of the second transistor receives a bias signal or is electrically coupled to the grounding voltage or supply power via an isolation capacitor, and thus the second transistor receives the compensating current passed through the compensating current generation unit or outputs the compensating current to the compensating current generation unit.

5. The surge current compensating circuit according to claim 2, wherein the comparator circuit has an auto-zero function, when the switch unit is disabled, the auto-zero function of the comparator circuit is disabled and the compensating current generation unit is enabled according to the output signal; and when the switch unit is enabled, the auto-zero function of the comparator circuit is enabled and the compensating current generation unit is disabled according to the output signal, to inhibit the compensating current generation unit from drawing the compensating current from the supply power.

6. The surge current compensating circuit according to claim 2, wherein the comparator circuit has an auto-zero function, the switch unit is an N-type transistor and receives an inverted auto-zero control signal, when an auto-zero control signal is logically high and the inverted auto-zero control signal is logically low, the N-type transistor is disabled, the auto-zero function of the comparator circuit is disabled and the compensating current generation unit is enabled according to the output signal; and when the auto-zero control signal is logically low and the inverted auto-zero control signal is logically high, the N-type transistor is enabled, the auto-zero function of the comparator circuit is enabled and the compensating current generation unit is disabled according to the output signal, to inhibit the compensating current generation unit from drawing the compensating current from the supply power.

7. The surge current compensating circuit according to claim 2, wherein the comparator circuit has an auto-zero function, the switch unit is an P-type transistor and receives an auto-zero control signal, when the auto-zero control signal is logically high and an inverted auto-zero control signal is logically low, the P-type transistor is disabled, the auto-zero function of the comparator circuit is disabled and the compensating current generation unit is enabled according to the output signal; and when the auto-zero control signal is logically low and the inverted auto-zero control signal is logically high, the P-type transistor is enabled, the auto-zero function of the comparator circuit is enabled and the compensating current generation unit is disabled according to the output signal, to inhibit the compensating current generation unit from drawing the compensating current from the supply power.

8. A comparator module, comprising: a comparator circuit; and a surge current compensating circuit, for compensating a surge current drawn from a supply power after an output signal of a comparator circuit transits, comprising: a compensating current generation unit, electrically coupled to an output stage of the comparator circuit, for drawing a compensating current from the supply power according to the output signal, wherein the compensating current substantially equals to the surge current, and a summation of a current flowing through the output stage of the comparator circuit and the compensating current is substantially unchanged regardless whether the output signal transits or not; a bias unit, electrically coupled to the compensating current generation unit, for providing a bias to the compensating current generation unit to receive the compensating current passed through the compensating current generation unit or output the compensating current to the compensating current generation unit; and a switch unit, electrically coupled between the compensating current generation unit and the bias unit; wherein before the output signal transits, the switch unit is disabled and the compensating current generation unit is enabled, so as to draw the compensating current from the supply power; wherein after the output signal transits, the switch unit is enabled and the compensating current generation unit is disabled, such that the compensating current is not drawn from the supply power.

9. The comparator module according to claim 8, wherein the comparator circuit has an auto-zero function, when the switch unit is disabled, the auto-zero function of the comparator circuit is disabled and the compensating current generation unit is enabled according to the output signal; and when the switch unit is enabled, the auto-zero function of the comparator circuit is enabled and the compensating current generation unit is disabled according to the output signal, to inhibit the compensating current generation unit from drawing the compensating current from the supply power.

10. The comparator module according to claim 8, wherein the comparator circuit has an auto-zero function, the switch unit is an N-type transistor and receives an inverted auto-zero control signal, when an auto-zero control signal is logically high and the inverted auto-zero control signal is logically low, the N-type transistor is disabled, the auto-zero function of the comparator circuit is disabled and the compensating current generation unit is enabled according to the output signal; and when the auto-zero control signal is logically low and the inverted auto-zero control signal is logically high, the N-type transistor is enabled, the auto-zero function of the comparator circuit is enabled and the compensating current generation unit is disabled according to the output signal, to inhibit the compensating current generation unit from drawing the compensating current from the supply power.

11. The comparator module according to claim 8, wherein the comparator circuit has an auto-zero function, the switch unit is an P-type transistor and receives an auto-zero control signal, when the auto-zero control signal is logically high and an inverted auto-zero control signal is logically low, the P-type transistor is disabled, the auto-zero function of the comparator circuit is disabled and the compensating current generation unit is enabled according to the output signal; and when the auto-zero control signal is logically low and the inverted auto-zero control signal is logically high, the P-type transistor is enabled, the auto-zero function of the comparator circuit is enabled and the compensating current generation unit is disabled according to the output signal, to inhibit the compensating current generation unit from drawing the compensating current from the supply power.

* * * * *